(No Model.)
P. V. DWYER.
PIPE JOINT.
No. 396,354. Patented Jan. 15, 1889.
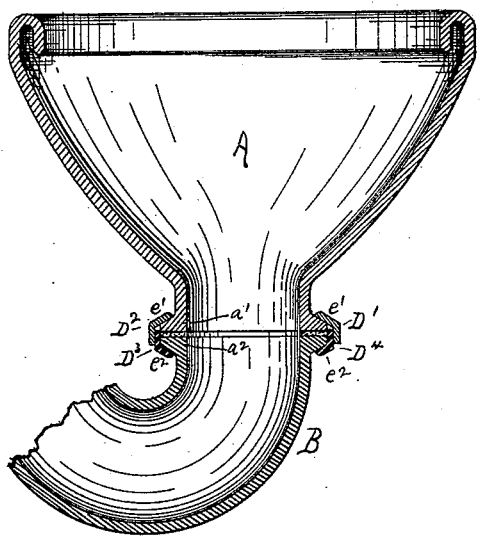
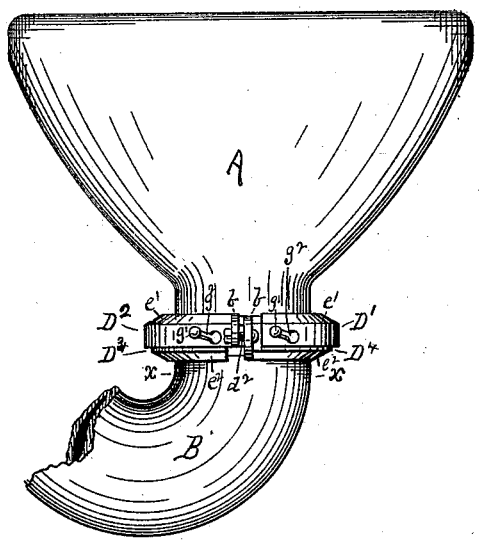
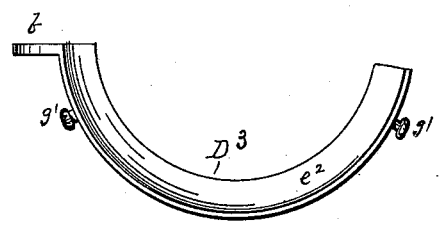
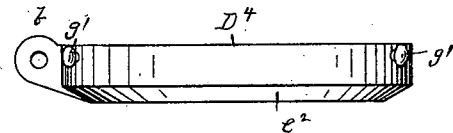
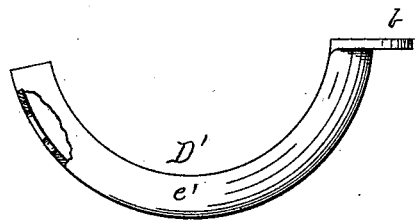
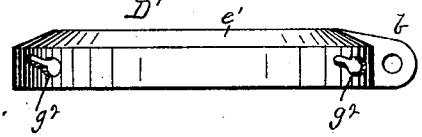
WITNESSES.
Patrick Vincent Dwyer,
INVENTOR BY
Charles N. Woodward
Atty.

United States Patent Office.

PATRICK VINCENT DWYER, OF ST. PAUL, MINNESOTA.

PIPE-JOINT.

SPECIFICATION forming part of Letters Patent No. 396,354, dated January 15, 1889.

Application filed October 22, 1888. Serial No. 288,794. (No model.)

*To all whom it may concern:*

Be it known that I, PATRICK VINCENT DWYER, a citizen of the United States, residing at St. Paul, in the county of Ramsey and State of Minnesota, have invented certain new and useful Improvements in Joints for Water-Closet and other Pipes, of which the following is a specification.

This invention relates to the joints of water-closet and other pipes; and it consists in the construction, combination, and arrangements, as hereinafter shown and described, and specifically pointed out in the claim.

In the drawings, Figure 1 is a sectional elevation, and Fig. 2 is a side elevation, of a water-closet bowl and a portion of its trap with one of my improved devices connecting them. Fig. 3 is a cross-sectional view on the line X X of Fig. 2 from below. Figs. 4, 5, 6, and 7 are enlarged detached views of the main sections of the coupling, more fully illustrating its construction.

A is the bowl, and B the "trap" pipe leading therefrom, the adjacent ends of these two parts being enlarged or flanged, as shown at $a'$ $a^2$, and with cement between them. Surrounding these flanges is a metal collar, formed in four semicircular sections, $D'$ $D^2$ $D^3$ $D^4$, the sections $D'$ and $D^2$ being counterparts and the sections $D^3$ $D^4$ being counterparts, and each section being provided with a perforated lug, $b$, the lugs of the sections $D'$ $D^3$ being united by a bolt, $d'$, and the lugs on the sections $D^2$ $D^4$ being united by a bolt, $d^2$, as shown more clearly in Fig. 3.

The sections $D'$ $D^2$ are formed with inclined upper surfaces, $e'$, adapted to rest upon the upper side of the flange $a'$ on the bowl A, while the sections $D^3$ $D^4$ have similar inclined lower surfaces, $e^2$, adapted to rest beneath the flange $a^2$ on the trap B, the main portions of the sections $D'$ $D^2$ overlapping and inclosing the main portions of the sections $D^3$ $D^4$, as shown more clearly in Fig. 1.

Upon each of the sections $D^3$ $D^4$ are two pins, $g'$, having enlarged heads and adapted to project through inclined slots $g^2$, formed to receive them through the body portions of the sections $D'$ $D^2$.

When the coupling is to be applied, the sections $D^2$ $D^3$ are united by inserting the pins $g'$ of the section $D^3$ through the slots $g^2$ of the section $D^3$, and the sections $D'$ $D^4$ similarly united, and the two pairs of united sections clasped around the flanges $a'$ $a^2$ of the joint and secured thereon by the bolts $d'$ $d^2$. The result of the action of the bolts is twofold—viz., drawing the sections tightly around the joint and at the same time drawing the two sets of sections nearer to each other, and consequently compressing them and exerting a pressure upon the two parts A B toward each other by the combined action of the inclined slots $g^2$ and the pins $g'$, the inclination of the slots tending to draw the coupled sections toward each other in a direction parallel to the line of the piping or other parts united. By this means a very simple and durable joint is formed, which by its flexibility will adapt itself to any slight irregularities of the flanges or other parts, and thus secure a perfect joint, without danger of breakage from undue pressure or unequal strains.

Having thus described my invention, what I claim as new is—

The combination, with a water-closet trap or other piping having flanged adjacent ends, of a coupling consisting of semicircular overlapping sections $D'$ $D^2$ $D^3$ $D^4$, said sections $D^3$ $D^4$ having pins $g'$, adapted to enter inclined slots $g^2$ in the sections $D'$ $D^2$, and said sections $D'$ $D^3$ united by one end on one side, and said sections $D^2$ $D^4$ united on the opposite side, whereby when said sections are drawn together around the piping the pins and inclined slots coact to cause said sections to draw the ends of the piping toward each other, substantially as and for the purpose set forth.

In testimony whereof I have hereunto set my hand in the presence of two subscribing witnesses.

PATRICK VINCENT DWYER.

Witnesses:
C. N. WOODWARD,
H. H. DEAN.